United States Patent [19]

Burns

[11] Patent Number: 4,605,290
[45] Date of Patent: Aug. 12, 1986

[54] COHERENT LIGHT VERGENCE VARYING APPARATUS

[75] Inventor: Richard H. Burns, North Hollywood, Calif.

[73] Assignee: Rockwell International Corporation, El Segundo, Calif.

[21] Appl. No.: 757,391

[22] Filed: Jul. 22, 1985

[51] Int. Cl.⁴ ............... H01S 3/081; G02B 5/04; G02B 5/08; G02B 17/00
[52] U.S. Cl. ................... 350/619; 350/623; 350/624; 372/107
[58] Field of Search ............... 350/618, 619, 620, 621, 350/622, 623, 624, 625, 626; 372/99, 107

[56] References Cited

U.S. PATENT DOCUMENTS

| | | | |
|---|---|---|---|
| 3,782,803 | 1/1974 | Buck | 350/619 X |
| 3,950,712 | 4/1976 | Chenausky et al. | 350/620 X |
| 4,049,945 | 9/1977 | Ehlscheid et al. | 350/624 X |
| 4,065,732 | 12/1977 | Scammell | 350/622 X |
| 4,087,162 | 5/1978 | Kuffer | 350/622 |
| 4,117,319 | 9/1978 | White, III | 350/620 X |
| 4,164,366 | 8/1979 | Sziklas et al. | 350/620 X |
| 4,190,814 | 2/1980 | VanWorkum | 372/99 X |
| 4,249,140 | 2/1981 | Frieberg | 372/107 X |
| 4,420,836 | 12/1983 | Harper | 350/619 X |

Primary Examiner—John Petrakes
Attorney, Agent, or Firm—H. Fredrick Hamann; Harry B. Field; Clark E. DeLarvin

[57] ABSTRACT

An apparatus for varying the vergence of a beam of light from a laser including first and second focusing reflector means; one for receiving the beam of light and another for directing it away from the apparatus in a predetermined direction. Intermediate the two focusing reflecting means, there is provided an arrangement of substantially flat surface reflector means, one of which is moveable for varying the length of the path of the beam of light through the apparatus. In accordance with a preferred embodiment, the two focusing reflecting means comprise parabolic mirrors and the moveable reflector means comprises a piston mirror.

6 Claims, 1 Drawing Figure

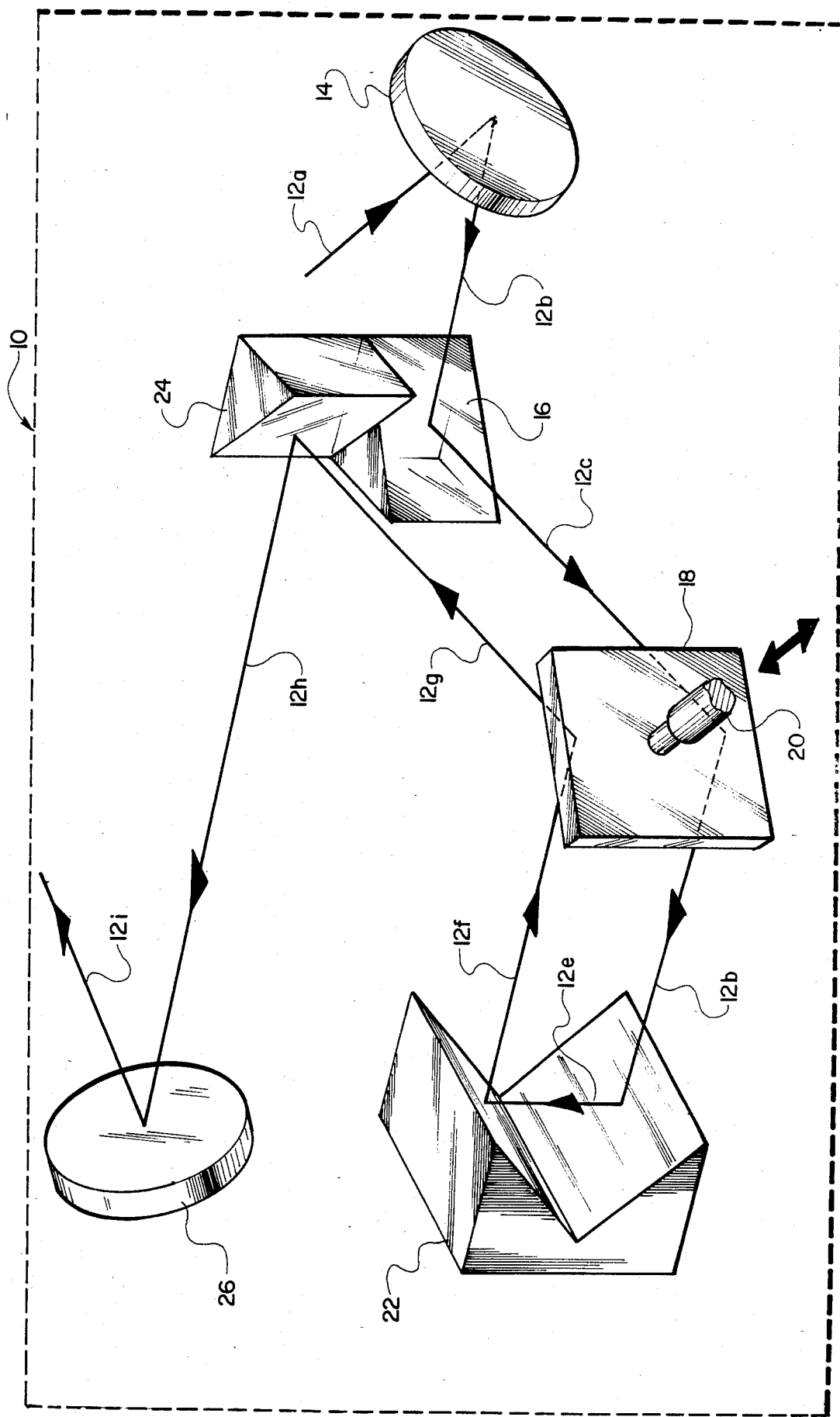

COHERENT LIGHT VERGENCE VARYING APPARATUS

STATEMENT OF GOVERNMENT INTEREST

The Government has rights to this invention pursuant to Contract No. F29601-82-C-0045 awarded by the U.S. Department of the Air Force.

BACKGROUND OF THE INVENTION

1. Field of the Invention

The present invention is directed to an apparatus for varying the vergence of a beam light from a laser. It particularly relates to such an apparatus which is capable of collimating such a beam of light whether said beam of light is slightly convergent or divergent.

2. Prior Art

The output beam of light from a laser (which may or may not be visible) is substantially collimated. However, such collimation is not perfect thus the beam of light will always have some degree of convergence or divergence. Occasionally there is a need to be able to adjust the vergence of such a beam of light to either collimate it or in the case of some weapons or communications applications, be able to cause it to diverge or converge such that at a predetermined distance, it will either cover a desired plane area for reception or a minimum area of maximum energy density.

In addition, during the testing and development of new laser designs, it is customary to analyze the output beam from the laser to determine its quality. This is done by focusing the beam or a portion thereof onto a plate or sensor for subsequent analysis. A problem arises, however, in that the vergence (convergence or divergence) is not known initially thus the proper placement of a focusing lens and the plate upon which the light is to be focused also is unknown. With relatively low power lasers, the placement of the analyzer plate and lens are readily determinable through trial and error if necessary. However, with high-energy, short-test duration lasers the problem becomes more acute because of the high power consumption. A lens mounted on a linear actuator may be adequate in some instances, but a multi-element lens may be required to obtain the desired focus and it could have a large mass such that it would be difficult to move rapidly and precisely to an appropriate position. In addition, a lens may introduce aberations into the beam, particularly if the laser produces energy on several spectral lines.

Clearly, there does exist a need for an all reflective apparatus for varying the vergence of a beam of light from a laser.

SUMMARY OF THE INVENTION

The present invention provides an apparatus for varying the vergence of a beam of light from a laser utilizing an array of commercially available reflector means. The apparatus includes a first focusing reflector means for receiving the beam of light and reflecting it angularly back on a different path, a first flat reflector means for receiving the beam of light from the first focusing reflector means and reflecting it angularly back to a moveable reflector means. The moveable reflector means is linearly moveable to all points between two positions for receiving the beam of light from the second reflector means throughout the linear movement between the two positions and reflecting the beam of light angularly back. The apparatus further includes a return reflector means for receiving the beam of light from the moveable reflector means and reflecting it back to the moveable reflector means on a path which is offset and parallel to that of the beam of light received for reflection back off of the moveable reflection means. The beam of light reflected back from the moveable reflector means impinges upon a second flat reflector means from which it is reflected angularly back and impinged upon a second focusing reflector means. The second focusing reflector means reflects the beam of light in a predetermined direction.

Movement of the moveable reflector means changes the length of the focal path through the apparatus and produces a corresponding change in the vergence of the beam of light reflected from the second focusing reflector means. In accordance with certain preferred aspects of the invention, the focusing reflector means are off axis parabolic mirrors and the moveable reflector means is a flat mirror attached to a piston for linear movement. In another preferred embodiment of the invention, the return reflector means comprises either a rooftop prism or a corner cube mirror. In accordance with another preferred embodiment of the invention, the moveable reflector means is linearly moveable to a position to collimate the beam of light.

It is an object of the invention to provide an apparatus for rapidly and precisely varying the vergence of a beam of light from a laser.

It is another object of the invention to provide an apparatus for varying the vergence of such a beam of light without introducing angular deflection of the output beam from the apparatus.

Another object of the invention is to provide an apparatus which will vary the vergence of a beam of light without introducing chromatic aberation.

Still another object of the invention is to provide an apparatus to collimate a beam of light from a laser.

These and other objects of the invention will be more apparent from the following detailed description of the drawing and preferred embodiment of the invention.

BRIEF DESCRIPTION OF THE DRAWING

The sole FIGURE is a perspective view of an arrangement of reflective means for varying the vergence of a beam of light in accordance with the present invention.

DESCRIPTION OF A PREFERRED EMBODIMENT

Referring to the sole FIGURE, therein is depicted an apparatus 10 for varying the vergence of a beam of light from a laser. For convenience, the housing and support structure for the various reflector means are not shown since such are well within the skill of one versed in the art and a matter of design choice. In accordance with the present invention, a beam of light $12_a$ from a laser is directed towards a first focusing reflector means 14 of apparatus 10. Focusing reflector means 14 may be a parabolic mirror, a spherical mirror or other focusing reflector means. Beam of light $12_a$ is reflected angularly back off the reflective surface of 14 as indicated by $12_b$ and impinged upon a first flat reflector means 16 which typically will be a reflective surface of a 45° prism. The beam of light is reflected angularly back from reflector means 16 as indicated by $12_c$ towards a moveable reflector means 18, which also has a flat reflective surface. Typically, moveable reflector means 18 will comprise a linearly moveable flat mirror which is actuated axially by a piston 20. Obviously any other type linear actuation device could be used.

From moveable reflector means 18 the beam of light is reflected angularly as indicated by $12_d$ to a return reflector means 22 which returns the beam of light to moveable reflector means 18 as indicated by $12_e$ and $12_f$. Return reflector means 22 may comprise either a rooftop prism (as shown) or a corner cube mirror.

As shown, the beam of light returned from return reflector means 22 is in an offset, parallel path to that of $12_d$. In a similar manner, the returned beam of light $12_f$ reflected off moveable reflector means 18 is in an offset parallel path to $12_c$ as indicated by $12_g$.

The beam of light indicated by $12_g$ impinges upon a second flat reflector means 24 which typically will be another 45° prism. From second flat reflector means 24, the beam of light is reflected angularly back as indicated by $12_h$ and impinges upon a second focusing reflector means 26. As with the first focusing reflector means 14, means 26 typically will be an off-axis parabolic mirror to direct the beam of light in a predetermined direction as indicated by $12_i$.

In operation, any axial movement of moveable reflector means 18 increases or decreases the optical path through apparatus 10 and produces a corresponding change in the vergence (convergence/divergence) of the laser light beam $12_i$. For convenience, the angle of incidence between the laser light beam and the flat surfaces of the reflector means is depicted as 45°. It will be apparent to those skilled in the art, that other angles could be utilized.

When the apparatus of the present invention is utilized for a high energy laser beam, there generally will be provided some means for cooling the various reflective surfaces. Typically such cooling is accomplished by passing a heat exchange medium in indirect contact with a back side of the reflective surfaces for the removal of heat therefrom. Such cooling provisions are well within the skill of the art and do not form a part of the present invention.

It will, of course, be realized that many variations in the configuration of the invention may be used. Thus, while the foregoing description illustrates a preferred embodiment of the invention, the invention may be otherwise practiced within the scope of the teaching set forth. Accordingly, the invention is not to be limited by the illustrative and specific embodiments described but its scope should be determined in accordance with the following claims.

What is claimed is:

1. An apparatus for varying the vergence of a beam of light from a laser comprising:
    first focusing reflector means for receiving said beam of light and reflecting it angularly back on a different path;
    first flat reflector means for receiving said beam of light from said first focusing reflector means and reflecting it angularly back;
    moveable reflector means linearly moveable along an axis between two positions for receiving said beam of light from said second reflector means throughout the linear movement between said two positions and reflecting said beam of light angularly back;
    return reflector means for receiving said beam of light from said moveable reflector means and reflecting it back to said moveable reflector means in an offset path parallel to that of said beam of light received and for reflection off said moveable reflector means;
    second flat reflector means for receiving said beam of light reflected off said moveable reflector means and reflecting it angularly back; and
    second focusing reflector means for receiving said beam of light from said second flat reflector means and reflecting it in a predetermined direction whereby during operation of said apparatus axial movement of said moveable reflector means changes the length of the focal path through said apparatus with a corresponding change in the vergence of said beam of light reflected from said second focusing reflector means.

2. The apparatus of claim 1 wherein said first and second focusing reflector means are parabolic mirrors and said first and second reflector means are 45° prisms with reflective hypotenuses.

3. The apparatus of claim 2 wherein said moveable reflector means comprises a flat mirror attached to a piston for said linear movement.

4. The apparatus of claim 3 wherein said return reflector means comprises a rooftop prism.

5. The apparatus of claim 3 wherein said return reflector means comprises a corner cube mirror.

6. The apparatus of claim 1 wherein said moveable reflector means is linearly moveable to a position to collimate said beam of light.

* * * * *